United States Patent [19]

Urmanov

[11] 4,045,528

[45] Aug. 30, 1977

[54] METHOD FOR MAKING LAMINATED PARTICLEBOARD OF ORIENTED WOOD PARTICLES

[75] Inventor: Urman Alexandrov Urmanov, Sofia, Bulgaria

[73] Assignee: DSO "Stara Planina", Sofia, Bulgaria

[21] Appl. No.: 539,994

[22] Filed: Jan. 10, 1975

Related U.S. Application Data

[62] Division of Ser. No. 430,909, Jan. 4, 1974, Pat. No. 3,963,400.

[30] Foreign Application Priority Data

Apr. 25, 1973 Bulgaria .................................. 23438

[51] Int. Cl.[2] .................................................. B29J 5/00

[52] U.S. Cl. ....................................... 264/69; 264/113

[58] Field of Search .................. 264/113, 108, 70, 71, 264/69

[56] References Cited

U.S. PATENT DOCUMENTS

| | | | |
|---|---|---|---|
| 3,098,781 | 7/1963 | Greten | 264/113 |
| 3,115,431 | 12/1963 | Stokes et al. | 264/113 |
| 3,246,064 | 4/1966 | Moore et al. | 264/113 |

*Primary Examiner*—Robert F. White
*Assistant Examiner*—James R. Hall
*Attorney, Agent, or Firm*—Karl F. Ross; Herbert Dubno

[57] ABSTRACT

A method of forming a multilayer blanket of wood particles adapted to be pressed into particle board in which a particle separator scatters the wood particles in separate streams by particle size. The finest-particle streams are deposited directly, i.e. without interception while the fine and coarse particle streams are intercepted by downwardly inclined plates formed with parallel channels for guiding the respective particles into separate layers on a moving support to form the blanket. The plates are vibrated so that the individual particles are oriented as they pass along the respective channels.

1 Claim, 4 Drawing Figures

METHOD FOR MAKING LAMINATED PARTICLEBOARD OF ORIENTED WOOD PARTICLES

This Application is a division of Ser. No. 430,909 filed Jan. 4, 1974, now U.S. Pat. No. 3,963,400 issued June 15, 1976.

This invention relates to a method of laminating a multilayer cushion of oriented wood particles for the production of particle board, wherein the lamination is carried out with layers of separated and oriented wood particles, which are parallel to the axis of the apparatus.

It is known, for the lamination of boards of oriented wood particles, to effect the orientation in an electrostatic field. It is a drawback of these methods that they can not provide a separation of the particles, and as a result the coarse particles get into the core layer, while the fine particles get into the surface layers. Moreover, the use of these methods imposes high requirements with regard to work safety.

Also known are methods for mechanical orientation of the wood particles, i.e. by permitting them to pass through narrow slits and building up the boards by pouring, however without separation of the layers.

Also known are methods and apparatus for mechanical orientation and pouring of the particles to build up boards in which the particles are separated so that the coarse particles form the core of the board, while the fine particles form the surface layers of the board. It is a drawback of such apparatus that the particles passing through them fall freely on a base upon which they are poured, and are thereby disoriented to a certain degree as a result of the impact.

It is an object of the present invention to avoid the aforementioned drawbacks.

This object is achieved in that the particles after being separated (classified) in pouring machines with a size-discriminating effect, are oriented in specially shaped chutes and orienting devices, which are arranged one after the other, and then are spread in layers to form particle laminates. In the case of separation of the particles by spraying it is necessary to use two pouring machines, while in the case of air separation only one machine is sufficient. The devices are arranged, depending on the path of the separated particles, so as to provide a sequential lamination of the multilayer boards; the surface layers are formed by powder and very fine non-oriented particles, the intermediate layer—by fine particles, and the central (core) layer—by coarse oriented particles.

For a better understanding of the invention, reference should be made to the accompanying drawings in which there is illustrated a preferred embodiment of the invention. In the drawing.

According to the invention, the apparatus comprises two pouring machines 1*a* and 1*b*, below which there are arranged orienting devices 2*a* and 2*b* for the intermediate layers and an orienting device 3 for the central layer. The distance between the orienting devices 2*a*, 2*b* and 3 are determined depending on the paths of the separated particles so that the coarse particles are deposited on the orienting device 3, and the fine particles upon the orienting devices 2*a* and 2*b*. In order to achieve a better separation of the particles in layers, a greater number of orienting devices can be provided. In the case of single-layer boards only one orienting device is required. Arranged below the orienting devices 2*a*, 2*b* for the intermediate layers and the orienting device 3 for the central layer is the conveyor belt 4, onto which the particles are laminated, forming a carpet 10. The orienting devices 2*a*, 2*b* and 3 are arranged at an acute angle with regard to the conveyor belt 4. Arranged over the orienting devices 2*a* and 2*b* for the intermediate layers are the directing metal sheets 5*a*, 5*c*, and over the orienting device 3—the directing metal sheets 5*b* and a further sheet 6.

Figure 1:
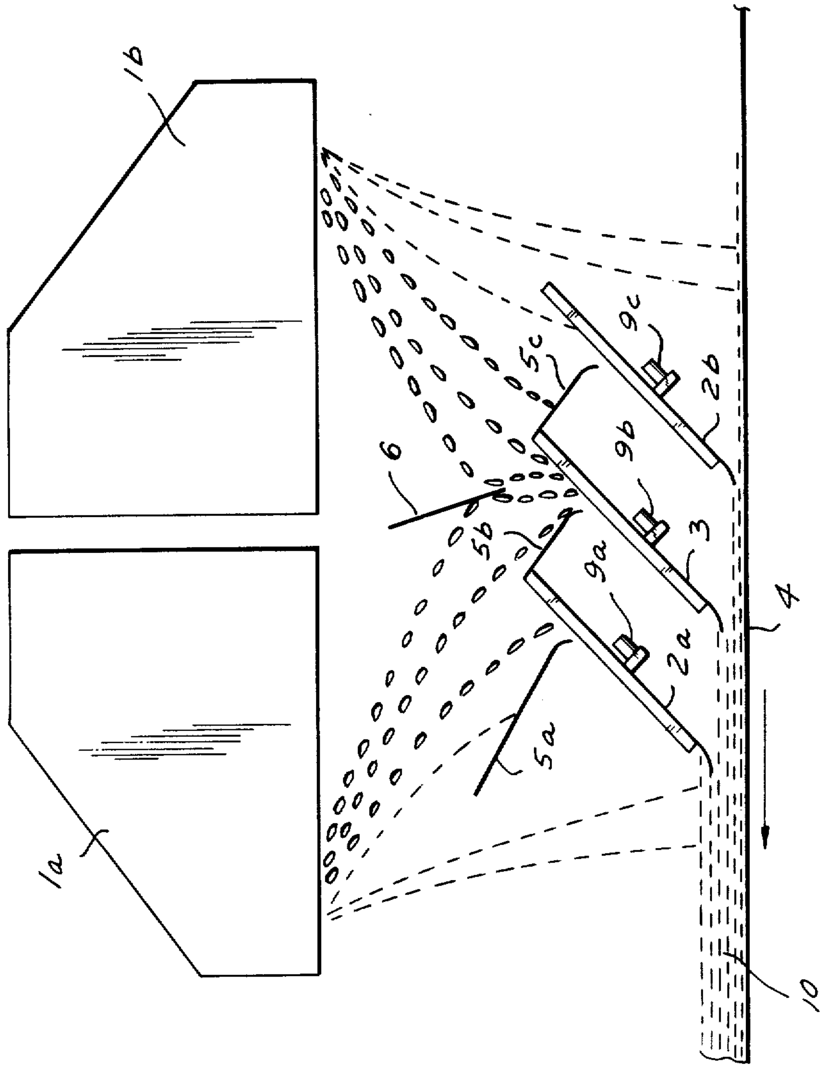
FIG. 1 is a diagrammatic elevational view illustrating the apparatus for orienting particles which have been separated by spraying.
Figure 4:
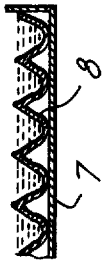
FIG. 4 is a cross-sectional view of the orienting device.
Figure 3:
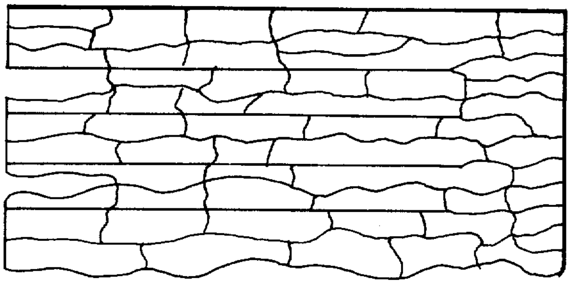
FIG. 3 is a top view of the orienting device.
Figure 2:
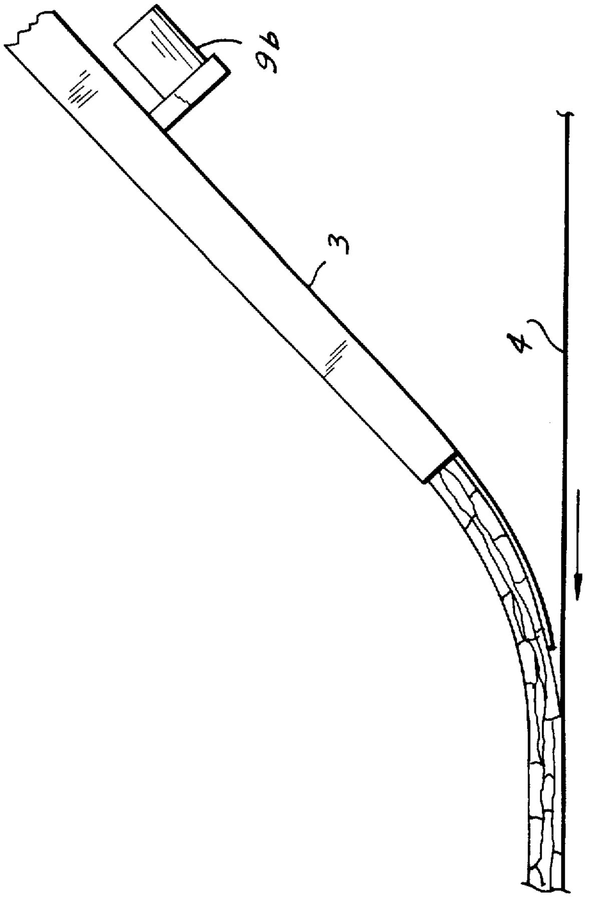
FIG. 2 is an enlarged side view of an orienting device.

Each of the orienting devices 2*a*, 2*b* and 3 comprises a base plate 7 (FIG. 4) on which there are arranged one next to the other the specially shaped chutes 8. The bottom end of each chute 8 is shorter than the plate 7. Attached to the base plate 7 of each orienting device 2*a*, 2*b* and 3 is a respective vibrator 9*a*, 9*c* and 9*b*.

The apparatus operates as follows: the particles, which are coated with adhesive and are separated by the pouring machines 1*a*, 1*b*, fall onto the orienting devices 2*a*, 2*b* and 3, which provide the lamination of boards of oriented particles, namely:

- the finest particles and the powder fall outside the orienting devices 2a, 2b and 3, directly onto the conveyor belt 4, forming the top and bottom thin surface layers of the boards;
- the fine particles are directed by the directing metal sheets 5*a* and 5*c* and fall onto the orienting devices 2*a*, 2*b* for the intermediate layers and are oriented and arranged in the intermediate layers;
- the coarse particles are directed by the directing metal sheets 5*b*, 6 to the orienting device 3 for coarse particles and are oriented and arranged in the central layer.

The orienting of the particles in the orienting devices 2*a*, 2*b* and 3 is effected by the specially shaped chutes 8 in the following way. The particles, which have fallen onto the orienting devices under the action of their own weight and the vibrations, fall into the shaped chutes and while sliding downwards in them, rub their longitudinal edges along the walls of the chutes 8, are arranged parallel to them and also parallel to each other. Under the effect of the vibrations, a further separation of the particles takes place, whereby the finer particles are deposited on the bottoms of the chutes. Since the chutes are specially shaped and converge toward their bottoms, good orientation of particles of different sizes is achieved. As they emerge from the chutes 8, the oriented particles pass across the bottom end of the base plate and under the effect of the vibrations they are spread to form a layer, and then, being in contact one with another in the layer, they are spread over the conveyor belt 4 forming a multilayer carpet, without being disoriented by free fall. The carpet is then conveyed to be pressed into boards.

I claim:

1. A method of forming a multilayer blanket of wood particles adapted to be formed into particle board, said method comprising the steps of:

providing a conveyor belt support surface;

classifying by particle size a mass of wood particles and dispensing the classified particles above said surface in at least three streams, including a finest-particle stream, a fine particle stream and a coarse particle stream;

permitting said finest-particle stream to fall unintercepted on said surface;

intercepting each of the other particle streams upon a respective guide plate inclined downwardly and in the direction of displacement of said surface toward the latter for laying the particles of said other streams on said surface in respective layers, said plates being formed with mutually parallel downwardly extending channels adapted to receive the respective wood particles and orient them longitudinally as they meet said surface and the respective layers; and vibrating said plates to align the successive particles in each of said channels.

* * * * *